US006682133B2

(12) United States Patent
Glasl

(10) Patent No.: US 6,682,133 B2
(45) Date of Patent: Jan. 27, 2004

(54) SHADE DEVICE FOR A TRANSPARENT ROOF ELEMENT

(75) Inventor: Sebastian Glasl, Munich (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/143,829

(22) Filed: May 14, 2002

(65) Prior Publication Data

US 2002/0195843 A1 Dec. 26, 2002

(30) Foreign Application Priority Data

May 14, 2001 (DE) .......................... 101 24 100

(51) Int. Cl.$^7$ .............. B60J 1/20; B60J 11/00
(52) U.S. Cl. ............. 296/216.01; 296/219; 296/141; 160/370.22
(58) Field of Search ............. 296/214, 97.4, 296/97.8, 98, 216.01, 219, 140, 141; 160/370.22, 265, 120

(56) References Cited

U.S. PATENT DOCUMENTS

| 448,759 | A | * | 3/1891 | Dyett |
|---|---|---|---|---|
| 1,130,848 | A | * | 3/1915 | Seward |
| 1,291,389 | A | * | 1/1919 | Brixey |
| 1,303,081 | A | * | 5/1919 | Losee |
| 1,340,797 | A | * | 5/1920 | Schoch |
| 1,359,066 | A | * | 11/1920 | Horton |
| 1,410,085 | A | * | 3/1922 | Wade |
| 3,183,033 | A | * | 5/1965 | Stulbach |
| 4,290,473 | A | * | 9/1981 | Pierson et al. ............. 160/120 |
| 4,363,513 | A | * | 12/1982 | Sahar ........................ 296/140 |
| 4,390,054 | A | * | 6/1983 | Niibori et al. ............. 160/265 |
| 4,836,264 | A | * | 6/1989 | Machin ...................... 160/120 |
| 4,874,026 | A | | 10/1989 | Worrall |
| 5,338,086 | A | * | 8/1994 | Tyutinman ................. 296/141 |
| 6,520,239 | B2 | * | 2/2003 | Schlecht et al. ........ 160/370.22 |
| 2003/0006630 | A1 | * | 1/2003 | Kralik et al. .............. 296/214 |

FOREIGN PATENT DOCUMENTS

| DE | 42 13 108 C2 | 10/1993 |
|---|---|---|
| DE | 197 50 715 C1 | 11/1998 |
| DE | 197 50 713 C1 | 12/1998 |
| DE | 197 32 686 A1 | 2/1999 |

* cited by examiner

Primary Examiner—Stephen T. Gordon
Assistant Examiner—Hilary Gutman
(74) Attorney, Agent, or Firm—Nixon Peabody LLP; David S. Safran

(57) ABSTRACT

A cover shade for a transparent roof element, window or the like, especially for motor vehicles, has a fabric shade (14) that is windable on and off of a winding shaft (12), a draw bar (16) at a free end of the fabric shade and which is movable in open and closing directions of the shade, a draw cable arrangement (20) which acts in the closing direction and which engages the draw bar, and a winding shaft reset spring which is tensioned when the shade is closed. The draw cable arrangement (20) has a draw cable (22) which runs from a fixed point (24) located in front of the draw bar (16) in the closing direction (18), via a deflection roller (26) located near one end of the bar, then via a second deflection roller (28) located near the other end of the bar, to an adjustable point (30) of application of the drawing force in front of the draw bar (16).

16 Claims, 2 Drawing Sheets

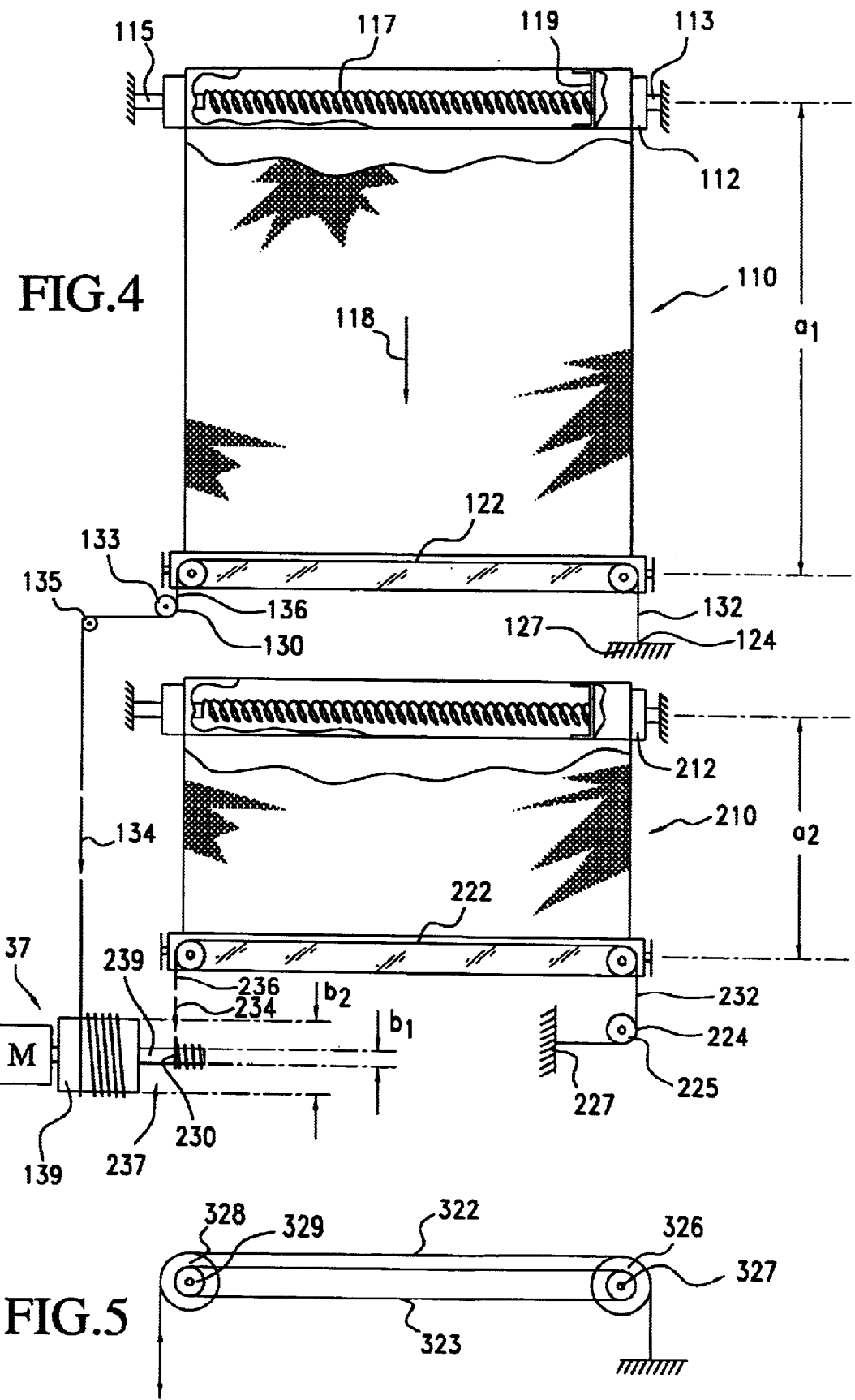

SHADE DEVICE FOR A TRANSPARENT ROOF ELEMENT

BACKGROUND OF THE INVENTION

1. Field of the Invention

This invention relates to a shade device for a transparent roof element, a window or the like, especially for motor vehicles, comprising a winding shaft with a fabric shade which can be wound onto or off of it, a draw bar which can moved in the winding and unwinding direction of the shade and which is located on the free end of the fabric shade, a draw cable arrangement which acts in the pull-out direction and which engages the draw bar, and a reset spring which is assigned to the winding shaft and which is tensioned when the shade is pulled out.

2. Description of Related Art

These shade devices are, for example, as a sunshade for a motor vehicle roof with a transparent or translucent cover which is assigned to the roof opening, as a glare shield in motor vehicle rear windows, as a vision shield in side motor vehicle windows, or the like. A general requirement for these shade devices, in addition to ease of handling and high operating reliability, is simple structure and a small space requirement. This applies especially to shade devices on motor vehicle roofs for which only a extremely small installation space is available.

Shade systems of the initially described type are characterized in that a drive force need only be applied in one direction, specifically the pull-out or closing direction, while the take-up or opening motion is effected by the reset spring which is tensioned during closing. This enables a simple, space-saving structure of the shade system and the assigned drive devices.

Another problem has also always been the exact parallel guidance of the draw bar which ensures jam-free motion of this draw bar and fold-free opening and closing of the shade. For this purpose, generally, a draw cable engages each end of the bar, and it must be ensured that the two draw cables are uniformly retracted during the closing motion and let out during the opening motion.

The aforementioned problems, especially the problem of the space requirement for the shade device, are exacerbated when there are to be two or more shade devices which are arranged in succession, as can be the case, for example, in very long vehicles, such as busses.

Published German Patent Application DE 197 32 686 A1 discloses an arrangement in which the draw cable arrangement has a single draw cable which runs from a fixed point located in the closing direction in front of the draw bar, via a first deflection roller which is located in the area of the first bar end, then via a second deflection roller located in the area of the second bar end, and from there to a drawing mechanism which pulls out the shade and which is located in front of the draw bar in the closing direction.

The draw cable accordingly has one fixed end which can be regarded as held at the fixed point, and one loose end which is connected directly, or optionally via deflectors, to the drawing mechanism. The draw cable can be not only cables, but can be any type of flexible drawing means, such as chains, belts, cables, bands or the like. The deflection rollers are preferably pivotally supported rollers; however, in a simpler embodiment and for jam-free guidance of the draw bar, there can also be stationary rollers, bolts or pins in place of deflection rollers, or there can be a guide channel for the draw cable on the draw bar.

When a tensile force is applied to the loose cable end and the entire cable length between the fixed point and the drawing mechanism is shortened, this shortening is distributed uniformly on the cable section which is assigned to the fixed point and to the cable section which is assigned to the point of application of the drawing force so that the draw bar is moved parallel to itself in the closing direction. In a corresponding manner the unwound cable length is distributed uniformly on the cable section assigned to the fixed point and the cable section assigned to the point of application of the drawing force when the draw cable is let out at the point of application of the drawing force, so that the draw bar moves under the action of the reset spring which drives the winding shaft uniformly in the opening direction.

In this way, with a cable adjustment mechanism which acts on a single draw cable, uniform and correct opening and closing of the shade device can be effected. It goes without saying that the deflection rollers should move easily and the cable should be guided without friction as much as possible via these deflection rollers.

The above described shade device has only been implemented to date in simple shades, since construction in arrangements with two or more shades is an obstacle to implementation and especially the problem of the space requirement for the drive devices of several shades is difficult to solve, especially in motor vehicles.

German Patent DE 42 13 108 C2 discloses a shade device with three shades which are located behind one another. However, the shades are connected directly to one another, i.e., they behave like a single shade, which increasingly clears a single area, for example, when opening and which covers the opening again when closing.

German Patent DE 197 50 713 C1 discloses a shade device with two fabric shades which can be wound onto a common winding shaft. Such a device allows only one closing or opening direction of the two shades at a time so that, in this respect, it can only be used to a limited degree; moreover, it is limited to two shades, i.e., more than two shades cannot be coupled to one another using this principle.

SUMMARY OF THE INVENTION

The object of the invention is to devise a shade device in which the entire surface which is to be covered by shades can be distributed among two or more individual shades with simple structural means and with a space requirement as small as possible.

This object is achieved in accordance with the present invention by:
- at least two identical shades being provided,
- all shades being actuatable at the same time by the same drawing mechanism,
- the draw cables of the shades being attached at one end to separate, shade-specific fixed points and at their other end being wound onto separate, shade-specific drum sections which are located next to one another on a drive shaft of the drawing mechanism, and
- the winding diameters ($b_1$, $b_2$) of the shade-specific drum sections being matched to the pull-out lengths of the shades such that all shades can be moved at the same time into their open and closed position by the drive shaft of the drawing mechanism.

First of all, the entire surface to be covered is efficiently divided and distributed among several shades, i.e., next to the first shade, there are at least one and optionally also several shades.

To simplify construction, all shades can be actuated at the same time by the same drawing mechanism, i.e., the cable ends of all shades are connected to a single drawing mechanism. To do this, these cable ends can each be wound onto separate, shade-specific drum sections which are located next to one another on the same drive shaft of the drawing mechanism; in order to take into account optionally different pull-out lengths of the shades, the winding diameters of the drum sections are each matched to the assigned pull-out lengths so that all the shades reach their pulled-out or taken-up position at the same time.

Other favorable embodiments of the individual shades and the assigned components of their drive systems are described below.

The winding diameters are easily determined such that the numerical ratio of respective shade pull-out lengths is equal to the numerical ratio of the winding diameter of the associated drum sections.

In order to further improve the run-off of the draw cable via the deflection rollers without slippage, and thus jam-free adjustment of the draw bar, according to one embodiment, it is provided that the two deflection rollers are rotationally coupled to one another and are thus synchronized.

In order to keep the required cable force as small as possible, it is provided that, preferably, both the cable section which is guided to the fixed point and also the cable section which is guided to the drawing mechanism each run essentially in the plane of the shade and in the closing direction, i.e., perpendicular to the draw bar so that there are no components of the cable force which are inactive for the closing motion.

The fixed point can be a point, for example, in which the cable is held in a cable clamping device. However, in order to be more free in terms of construction, the fixed point can also be defined, for example, by a cable deflection device via which the draw cable is guided to a cable clamping device located to the rear. It is irrelevant for the operation of the shade device that the draw cable runs behind the cable deflection device, but this expands the possibilities for an arrangement of the cable clamping device in structurally favorable terms.

Similarly, the drawing mechanism can directly, or optionally via deflectors, engage the assigned cable section. The latter embodiment, in turn, enables a structurally, largely free arrangement of the drawing mechanism, as is explained in detail below.

Especially in horizontal shade devices, i.e., for example, in shade devices for a motor vehicle roof, it is effective and conventional to guide the draw bar in guide rails which are arranged lateral with respect to the closing direction; in this case, according to another embodiment of the invention, it is provided that the cable sections guided to the fixed point and to the drawing mechanism each run in an assigned guide rail. In this way, these cable sections, on the one hand, themselves, acquire guidance, and on the other hand, they are covered in an aesthetically pleasing manner by the guide rails.

An aesthetically pleasing approach which is likewise structurally favorable arises according to another embodiment of the invention in that the reset spring is a flat spiral spring which is located within the winding shaft, with one spring end which is connected to the rotary winding shaft and with the other end connected to a torsionally strong bearing journal or the like which projects into the winding shaft.

The cable adjustment mechanism, in the simplest case, can be a handle which is located on the loose end of the cable, via which a drawing force can be applied to the draw cable, and which, for example, can be suspended in a suitable locking device for locking the shade device. However, in one preferred embodiment, the cable adjustment mechanism comprises cable drums which, in the simplest case, can be rotationally-driven manually, but preferably are driven by means of an electric motor.

Several embodiment of the invention are shown in the drawings and are explained in detail with reference thereto below.

BRIEF DESCRIPTION OF THE DRAWINGS

FIG. 4 is a plan view of the shade device with two shades; and

FIG. 5 is a side view of two rotationally-joined deflection rollers of the draw bar.

DETAILED DESCRIPTION OF THE INVENTION

Figure 1:
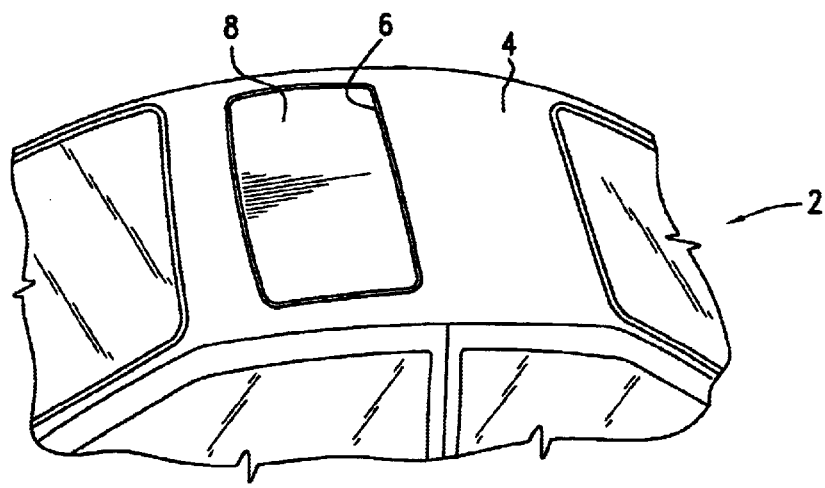
FIG. 1 schematically shows a perspective view of a motor vehicle roof.

FIG. 1 shows a motor vehicle 2 with a fixed vehicle roof 4 in which a roof opening 6 is provided that can be closed by a cover 8. The cover 8 can be either a permanently installed or an openable cover, specifically, for example, a lifting roof, a sliding roof, a sliding and lifting roof, or a spoiler roof. The cover 8 is made of a transparent or translucent material, for example, glass or acrylic glass.

Figure 2:
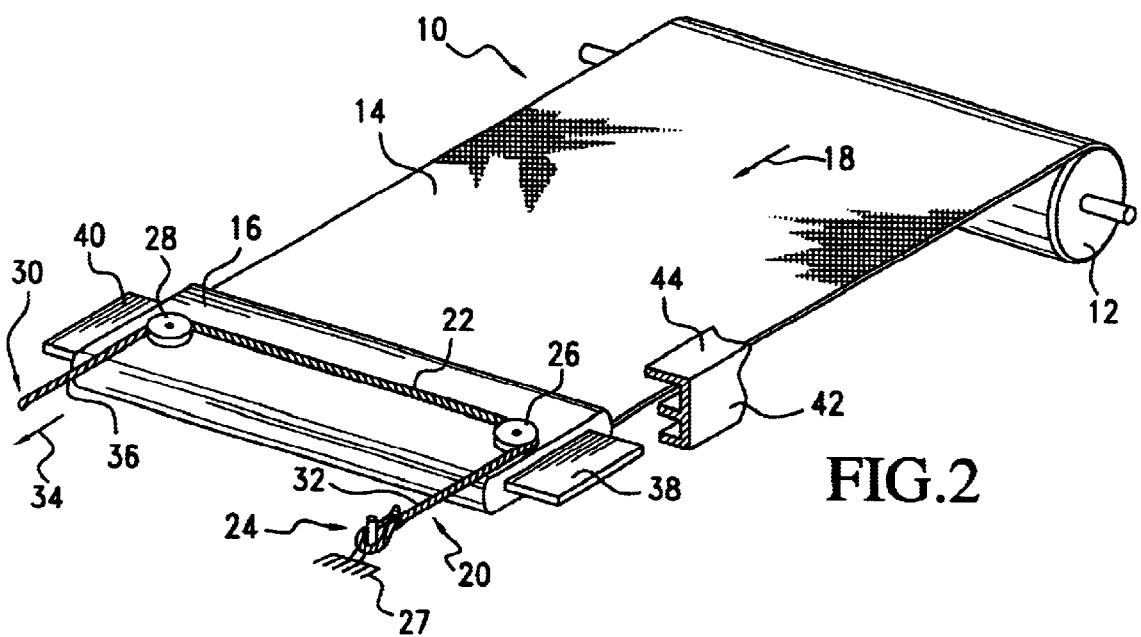
FIG. 2 schematically shows a perspective view of an individual shade device for installation in the roof opening of the motor vehicle roof of FIG. 1, which can be combined in accordance with the invention with at least one additional shade device.

The essentially rectangular roof opening 6 is bordered by a peripheral frame arrangement which is comprised of profile elements in the conventional manner, which therefore is not explained in detail. The peripheral frame, on the one hand, is used as a reinforcement of the motor vehicle roof 4 which is weakened by the roof opening 6, and on the other hand, for holding and optionally guiding the cover 8. Moreover, a shade device which covers the roof opening 6 is inserted roughly as shown in FIG. 2 into the frame arrangement from underneath. The fabric shade of the shade device preferably is made of the same material as the vehicle roof headliner so that, when the shade device is closed, it offers a uniform appearance with the roof headliner. However, one important function of the shade device is to screen the sunlight passing through the cover 8.

FIG. 2 serves mainly to explain the technical features implemented in the individual shades of FIG. 4.

The shade device 10 shown in FIG. 2 comprises essentially a winding shaft 12, a fabric shade 14 which can be wound onto or off of shaft 12, a draw bar 16 which is located on the free end of the fabric shade 14, and a draw cable arrangement 20 which acts in the closing direction labeled by the arrow 18 and which engages the draw bar for closing the shade device 10. To open the shade device 10 in the direction of opening which is opposite the arrow 18 a conventional reset spring is used which is assigned to the winding shaft 12, is tensioned when the shade device 10 is opened and by means of which the fabric shade 14 is wound onto the winding shaft 12 when the draw cable, which acts on the draw cable arrangement 20, is released.

The draw cable arrangement 20 is comprised essentially of a single draw cable 22 which runs from the fixed point 24 which is defined by a cable holding device 27 and which is located in front of the draw bar 16 in the closing direction, via a first deflection roller 26 which is located in the area of the first end of the bar, then via a second deflection roller 28 located in the area of the second bar end, and from there to an adjustable drawing mechanism which is located in front of the draw bar in the closing direction. The point 30 of application of the drawing force 34 is an imaginary point to which the assigned cable section 36 is guided and in which the drawing force 34 can be imagined as being applied. In practice, the cable section 36 can be connected to any cable adjustment mechanism at the point 30 of application of the drawing force, or it can, for example, enter a deflection device at the point of application of the drawing force and can be joined to a drawing or cable adjustment mechanism behind this deflection device, as is explained detail using one embodiment. Similarly, the fixed point 24 can be defined by a deflection device, the actual fixing of the cable section 32 assigned to the fixed point taking place behind this deflection device in a cable clamping device.

The shade device 10 works as follows: If a drawing force 34 is applied to the cable section 36, then the entire draw cable 22 is shortened, this shortening being distributed uniformly on the cable sections 32, 36. In this way, the draw bar 16 is moved parallel to itself in the closing direction 18 and the shade device 10 is closed. When the drawing force acting on the cable section 36 is canceled, the draw bar 16 can move under the action of the reset spring of the winding shaft 12 in the opening direction, opposite the direction of the arrow 18; the lengthening of the draw cable 22 which occurs here can, in turn, be distributed uniformly among the two cable sections 32, 36 so that the draw bar 16 can be adjusted without jamming and parallel to itself.

Figure 3:
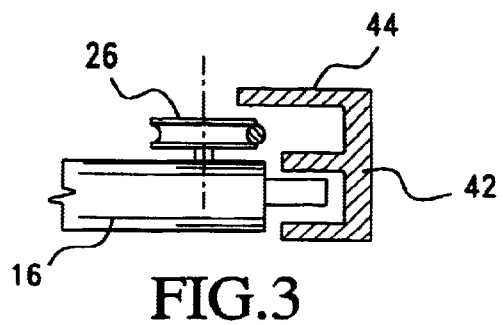
FIG. 3 shows a detail of FIG. 2 in a sectional view.

As follows from FIGS. 2 & 3, the ends of draw bar 16 are provided with guide shoes 38, 40 which are guided in mirror-image guide rails 42 which are arranged laterally with respect to the closing direction 18 (of which rails, FIG. 2 shows only a fragment of one). As follows especially from FIG. 3, the guide rails 42 each have an upper cover flange 44 which cover the cable sections 32, 36 which run from the deflection rollers 26, 28 each to the fixed point 24 or the point 30 of application of the drawing force 34.

FIG. 4 shows a shade device in accordance with the invention which comprises two successive shades 110, 210. The shade 210 can correspond, for example, exactly to the shade 10 which is shown in FIG. 2. Using the example of the shade 110, the structure of the winding shaft 112 is shown. It is made as a hollow shaft and is pivotally mounted on either side on torsionally strong bearing journals 113, 115. Within the winding shaft 112, there is a flat spiral spring 117 which is used as a reset spring; one end of the spiral spring is connected, for example, to the bearing journal 115 and its other end is connected to a holding clip 119 which is located stationary in the winding shaft 112. When the shade closes in the direction of the arrow 118 the flat spiral spring 117 is tensioned so that it stores the reset force which is necessary for opening the shade.

As is further shown using the shade 110, the draw cable 122 which is assigned to it has a cable section 132 which is securely anchored directly at the fixed point 124 in any manner in a cable holding device 127. A cable section 136 is guided via deflection rollers 133, 135 to a cable adjustment mechanism which is generally labeled 137. The point of application of the drawing force 134 is defined, in this case, by the point at which the cable section 136 runs onto the first deflection roller 133 in which the drawing force 134 which is applied by the cable adjustment mechanism 137 acts on the cable section 136. Deflection of the loose end of the cable makes it possible to place the cable adjustment mechanism 137 at any structurally favorable location.

The shade 210 has a structure similar to the shade 110 so that it need not be described in detail. The draw cable 222 has a first cable section 232 which is guided to a fixed point 224. The fixed point 224 is defined by the feed point onto the deflection roller 225 from which the fixed end of the draw cable is guided to a cable holding device 227. The other cable section 236 is guided directly to the cable adjustment mechanism 237 which applies a drawing force 234 which acts in the closing direction to the cable section 236. The point 230 of application of the drawing force 234 is defined by the point at which the cable section 236 runs onto the drum section 239.

As is shown in FIG. 4, the loose cable sections 136, 236 of the two shade devices 110, 210 are guided on a common cable adjustment mechanism 137, 237 which comprises an electrical drive motor M.

In this way, the two shade devices 110, 210 can be actuated jointly by a single cable adjustment mechanism.

This common cable adjustment mechanism comprises a cable drum arrangement with a first drum section 139 for the loose cable end of the shade device 110 and a second drum section 239 for the loose cable end of the shade device 210. As can be further seen from FIG. 4, the shade devices 110, 210 have different pull-out lengths $a_1$, and $a_2$. Accordingly the drum sections 139, 239 have different drum diameters $b_1$, $b_2$. The following relationship between the lengths and diameters applies: $a_1/a_2=b_1/b_2$. In this way, the winding path of the drum section 139 referenced to one revolution of the cable drum arrangement to the winding path of the drum section 239 behaves like the pull-out length $a_1$ to the pull-out length $a_2$. This means that the two shade devices 110, 210 are each opened or closed in the same time interval.

FIG. 5 shows one detail of a draw cable arrangement. In order for the draw cable 322 to run off via the deflection rollers 326, 328 without slippage and friction, these two deflection rollers are drive-connected to one another by a drive belt 323. For this purpose, synchronization rollers 327, 329 are assigned to each of the deflection rollers 326, 328. The synchronization rollers 327, 329 are permanently connected to deflection rollers 326, 328 and the drive belt 323 is guided on the synchronization rollers 327, 329.

The motor M can also be located on a fixed element between the two shade devices 110, 210 in the arrangement with two shade devices according to FIG. 4. The second shade device 210 can also be located opposed to the first shade device 110 so that the draw bars run toward one another when the shade lengths are pulled out, therefore when actuated in the closing direction.

What is claimed is:

1. Shade device for roof elements of motor vehicles, comprising:
    a first winding shaft with a first fabric shade which can be wound onto and off of the first winding shaft,
    a first draw bar which is movable in winding and unwinding directions of the first fabric shade and which is located on a free end of the first fabric shade,
    a first draw cable arrangement which acts in a pull-out direction of the first shade and which engages the first draw bar via a single draw cable,
    a first reset spring which is connected to the winding shaft and which is adapted to be tensioned when the first fabric shade is pulled out, a second winding shaft with a second fabric shade which can be wound onto and off of the second winding shaft, a second draw bar which is movable in winding and unwinding directions of the second fabric shade and which is located on a free end of the second fabric shade, a second draw cable arrangement which acts in a pull-out direction of the second shade and which engages the second draw bar via a single draw cable, a second reset spring which is connected to the second winding shaft and which is adapted to be tensioned when the second fabric shade is pulled out, a drawing mechanism for actuating all of the shades at the same time, wherein the draw cables of the draw cable arrangements are attached at one end to separate, shade-specific fixed points and at another end being wound onto separate, shade-specific drum sections which are located next to one another on a drive shaft of the drawing mechanism, and wherein the shade-specific drum sections have respective winding diameters ($b_1$, $b_2$) which are matched to respective pull-out lengths ($a_1$, $a_2$) of the shades such that the shades are movable at the same time into open and closed positions thereof by the drive shaft of the drawing mechanism.

2. Shade device as claimed in claim 1, wherein the numerical ratio of the shade pull-out lengths ($a_1$, $a_2$) is equal to the numerical ratio of the winding diameters ($b_1$, $b_2$) of the drum sections.

3. Shade device as claimed in claim 1, wherein for each of the first fabric shade and second fabric shade, two deflection rollers are located on the respective draw bar, and wherein said two deflection rollers are forcibly rotationally coupled by a continuous drive belt which connects the two deflection rollers to one another.

4. Shade device as claimed in claim 1, wherein, for each of the first fabric shade and the second fabric shade, a first section of the respective draw cable is guided to the fixed point and a second section is guided to a point of application of drawing force, each of said sections running in a plane of the pull-out direction the shade.

5. Shade device as claimed in claim 1, wherein for each of the first fabric shade and the second fabric shade the fixed point is formed by a cable holding device.

6. Shade device as claimed in claim 5, wherein a separate deflection roller is provided between the cable holding device and the draw bar.

7. Shade device as claimed in claim 1, wherein, for each of the first fabric shade and the second fabric shade, the respective draw bar is guided in guide rails which are at lateral sides of the shade with respect to the pull-out direction, and wherein the respective cable sections which are guided to the respective fixed point and to the drawing mechanism are each guided within a respective one of the guide rails.

8. Shade device as claimed in claim 1, wherein a separate deflection roller is provided between the drawing mechanism and a respective one of the draw bars.

9. Shade device as claimed in claim 1, wherein, for each of the first fabric shade and the second fabric shade, the respective reset spring is a flat spiral spring which is located within the respective winding shaft with one spring end connected to the winding shaft and the other spring end connected to a bearing journal which projects into the winding shaft and with respect to which the winding shaft is rotatable.

10. Shade device as claimed in claim 2, wherein for each of the first fabric shade and the second fabric shade, two deflection rollers are located on the respective draw bar, and wherein said two deflection rollers are forcibly rotationally coupled by a continuous drive belt which connects the two deflection rollers to one another.

11. Shade device as claimed in claim 10, wherein, for each of the first fabric shade and the second fabric shade, a first section of the respective draw cable is guided to the fixed point and second section is guided to a point of application of drawing force, each of said sections running in a plane of the pull-out direction the shade.

12. Shade device as claimed in claim 11, wherein for each of the first fabric shade and the second fabric shade the fixed point is formed by a cable holding device.

13. Shade device as claimed in claim 12, wherein a separate deflection roller is provided between the cable holding device and the draw bar.

14. Shade device as claimed in claim 13, wherein, for each of the first fabric shade and the second fabric shade, the respective draw bar is guided in guide rails which are at lateral sides of the shade with respect to the pull-out direction, and wherein the respective cable sections which are guided to the respective fixed point and to the drawing mechanism are each guided within a respective one of the guide rails.

15. Shade device as claimed in claim 14, wherein a separate deflection roller is provided between the drawing mechanism and the respective draw bar.

16. Shade device as claimed in claim 15, wherein, for each of the first fabric shade and the second fabric shade, the respective reset spring is a flat spiral spring which is located within the respective winding shaft with one spring end connected to the winding shaft and the other spring end connected to a bearing journal which projects into the winding shaft and with respect to which the winding shaft is rotatable.

* * * * *